T. J. NASH.
STEERING MECHANISM.
APPLICATION FILED JAN. 12, 1916. RENEWED SEPT. 27, 1916.
1,206,023.
Patented Nov. 28, 1916.
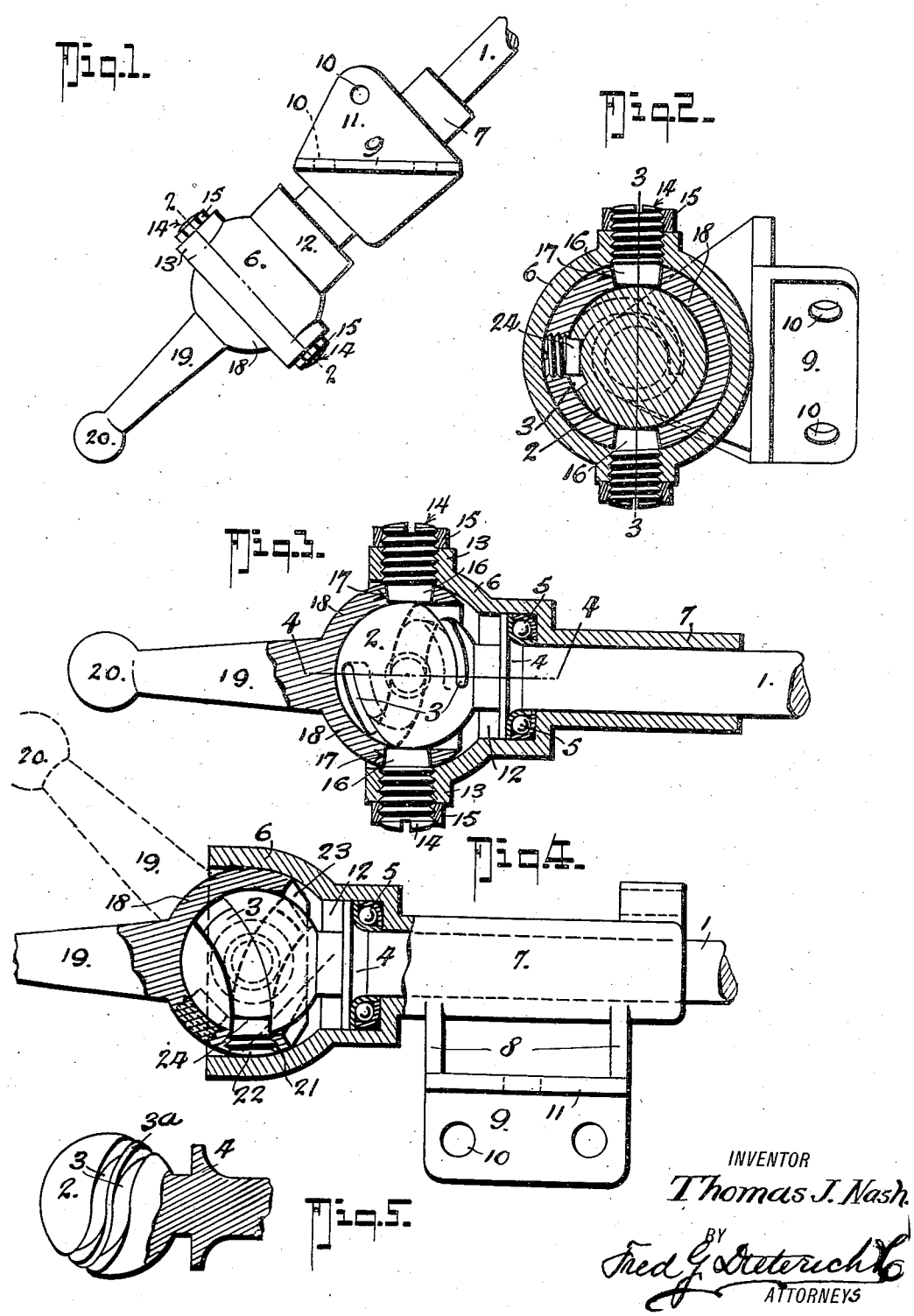
INVENTOR
Thomas J. Nash.
BY
Fred G. Dieterich
ATTORNEYS

UNITED STATES PATENT OFFICE.

THOMAS J. NASH, OF LINCOLN, NEBRASKA, ASSIGNOR TO NASH MANUFACTURING COMPANY, OF LINCOLN, NEBRASKA.

STEERING MECHANISM.

1,206,023.  Specification of Letters Patent.  Patented Nov. 28, 1916.

Application filed January 12, 1916, Serial No. 71,680. Renewed September 27, 1916. Serial No. 122,558.

*To all whom it may concern:*

Be it known that I, THOMAS J. NASH, residing at Lincoln, in the county of Lancaster and State of Nebraska, have invented certain new and useful Improvements in Steering Mechanism, of which the following is a specification.

My invention relates to certain new and useful improvements in steering apparatus of the irreversible type in which the road shocks of the steered wheels are not transmitted to the operator's hand wheel to turn the same.

The invention constituting the present application comprises a supporting housing in bearings in which the steering post shaft is mounted, the housing having bearings for the crank shaft, the crank shaft including a portion coöperating with the supporting casing to form a closure for a globoid-spiral operating connection between the steering post shaft and the crank shaft.

In its more detail nature, the invention provides a modification of the construction shown in my application filed on the 4th day of January, 1916, Serial No. 70,195, and the invention further includes those novel details of construction, combination and arrangement of parts, all of which will be first fully described, then be specifically pointed out in the appended claims, and illustrated in the accompanying drawings, in which:—

Figure 1 is a side elevation of a steering post shaft together with the parts constituting my invention. Fig 2 is a cross section on the line 2—2 of Fig. 1. Fig. 3 is a vertical longitudinal section on the line 3—3 of Fig. 2. Fig. 4 is a horizontal section on the line 4—4 of Fig. 3. Fig. 5 is a detail view of a modification of the invention.

In the drawing, in which like numerals of reference indicate like parts in all of the figures, 1 represents the steering post shaft which is provided at its end with a ball or globular member 2, in which is a spiral groove 3 of any desired length or number of convolutions, the groove 3 being of uniform depth whereby the radius of the bottom of the groove is the same throughout the length of the groove and is struck from the center of the ball, as in my application above referred to.

The shaft 1 is provided with a thrust cone 4 and a thrust bearing 5 is located in the chamber 12 of the supporting casing 6, the latter being of semi-spherical form to extend over the semi-spherical casing 18 of the crank shaft, the mouth or opening of the casing 6 being straight cut or of cylindrical form to permit of the introduction of the casing portion 18 of the crank shaft, the casing portion 18 of the crank shaft being bored to form a semi-spherical socket to receive the ball 2 and act as a thrust bearing for the same. The mouth of the casing 18, like the mouth of the casing 6, is of cylindrical formation to permit of the introduction of the ball 2.

The casing 6 is provided with an elongated neck 7 to form the principal bearing for the shaft 1 and from the neck 7 bracket extensions 8—9—11 are projected, the portions 9 and 11 of the bracket lying in planes at right angles to each other and are provided with holes 10 through which the device may be bolted to the frame of the vehicle.

The casing section 6 is provided with bosses 13 tapped to receive the bearing screws 14 which have coniform ends 16 to project into the coniform apertures 17 of the casing section 18 of the crank shaft to form trunnion bearings for the crank shaft. The provision of the ends 16 and the hole 17 of coniform or tapered wall structure is preferable for purposes of adjustment in taking up wear, although I do not wish to be limited to this detail of construction.

The crank 19 is provided with the usual ball 20 to which the connecting rod of the steering gear of the automobile is coupled in the usual way.

Instead of providing a single groove 3 in the ball, a double groove 3 may be provided, the web 3ª of which forms a globoid-spiral thread, as it were, (see Fig. 5). The casing section 18 of the crank shaft, which section also forms the bearing member to coöperate with the trunnion screws 14, is also tapped at 21, to receive a screw 22 whose end 24 projects into the groove 3, it being understood that if a double spiral groove is provided, a corresponding number of screws 22 will be employed to engage the same.

The construction illustrated in the accompanying drawing is but one form of the invention and has been specially designed to be attached to the well-known Ford car, but it should, however, be understood that changes in the details of construction, arrangement of casing, bearing elements, etc., proportion of parts and mechanical details of the same may be altered or varied to suit the particular car on which the invention may be employed.

In operation when the parts are in the position shown in full lines in Fig. 4, for instance, the arm 19 is extended in alinement with the shaft 1, but by turning over the shaft in a right handed or left handed direction, the arm 19 may be moved to one side or the other, as shown in dotted lines in Fig. 4, as will be readily understood by those skilled in the art.

The casing member 18 has its entrance cut away at diametrically opposite places, as indicated by 23 so as to fit around the shaft 1 when the parts are in the dotted position shown in Fig. 4, thereby giving, with a large bearing surface, a full freedom of sweep of the arm.

From the foregoing description taken in connection with the accompanying drawing, it is thought the complete construction, operation and advantages of my invention will be readily understood.

What I claim is:

1. In a steering mechanism, a steering post shaft, a crank arm having a spherical socket member at one end, a ball on the steering post shaft to fit into said socket, a pin and slot connection between said ball and socket, a supporting casing in which said steering post shaft is journaled, and trunnion elements on said supporting casing and engaging bearing recesses in said socket.

2. In a steering mechanism, the combination with the steering post shaft, of a supporting casing having a bearing in which said steering post shaft is journaled, said casing having a spherical section, a ball on the end of said shaft, a crank member having a spherical socket fitted into said spherical section with bearing engagement, said spherical section and said spherical socket forming a housing for said ball, trunnion bearings connecting said spherical socket with said spherical section to form an axis on which said arm may be turned, and a globoid-spiral slot and pin connection between said ball and said socket.

3. In a steering mechanism, the combination with the steering post shaft, of a supporting casing having a bearing in which said steering post shaft is journaled, said casing having a spherical section, a ball on the end of said shaft, a crank member having a spherical socket fitted into said spherical section with bearing engagement, said spherical section and said spherical socket forming a housing for said ball, trunnion bearings connecting said spherical socket with said spherical section to form an axis on which said arm may be turned, a globoid-spiral slot and pin connection between said ball and said socket, said spherical socket forming an end thrust bearing for said steering post shaft when moved in one direction, and a ball thrust bearing in said casing to sustain the end thrust of said steering post shaft in the opposite direction.

4. In a steering mechanism, the combination with the steering post shaft, of a supporting casing having a bearing in which said steering post shaft is journaled, said casing having a spherical section, a ball on the end of said shaft, a crank member having a spherical socket fitted into said spherical section with bearing engagement, said spherical section and said spherical socket forming a housing for said ball, trunnion bearings connecting said spherical socket with said spherical section to form an axis on which said arm may be turned, and a globoid-spiral slot and pin connection between said ball and said socket, said pin and slot connection including a screw tapped into said socket member and projecting into the slot in said ball.

5. In a steering mechanism, the combination with the steering post shaft, of a supporting casing having a bearing in which said steering post shaft is journaled, said casing having a spherical section, a ball on the end of said shaft, a crank member having a spherical socket fitted into said spherical section with bearing engagement, said spherical section and said spherical socket forming a housing for said ball, trunnion bearings connecting said spherical socket with said spherical section to form an axis on which said arm may be turned, a globoid-spiral slot and pin connection between said ball and said socket, said spherical socket forming an end thrust bearing for said steering post shaft when moved in one direction, and a ball thrust bearing in said casing to sustain the end thrust of said steering post shaft in the opposite direction, said pin and slot connection including a screw tapped into said socket member and projecting into the slot in said ball.

THOMAS J. NASH.